(12) United States Patent
Yokota (10) Patent No.: US 6,857,613 B2
(45) Date of Patent: Feb. 22, 2005

(54) SLIDE DEVICE FOR AUTOMOTIVE SEAT (75) Inventor: Masaaki Yokota, Tokyo (JP)

(73) Assignee: Tachi-S Co., LTD, Tokyo (JP)

( * ) Notice: Subject to any disclaimer, the term of this patent is extended or adjusted under 35 U.S.C. 154(b) by 0 days.

(21) Appl. No.: 10/784,802

(22) Filed: Feb. 24, 2004

(65) Prior Publication Data

US 2004/0164218 A1 Aug. 26, 2004

(51) Int. Cl.[7] .............................................. F16M 13/00
(52) U.S. Cl. ........................ 248/429; 248/430; 248/602
(58) Field of Search ................................ 248/429, 430, 248/602, 419, 420; 296/65.18, 65.05; 74/425, 89.14, 89.28

(56) References Cited

U.S. PATENT DOCUMENTS

| | | | | |
|---|---|---|---|---|
| 4,621,784 A | * | 11/1986 | Kaesling et al. | 248/430 |
| 4,805,866 A | * | 2/1989 | Aihara et al. | 248/429 |
| 5,014,960 A | * | 5/1991 | Kimura | 248/602 |
| 5,018,452 A | * | 5/1991 | Chauvet | 104/172.3 |
| 5,150,872 A | * | 9/1992 | Isomura | 248/429 |
| 5,573,219 A | * | 11/1996 | Chinomi | 248/421 |
| 5,791,622 A | * | 8/1998 | Gauger | 248/430 |
| 5,829,727 A | * | 11/1998 | Chinomi et al. | 248/429 |
| 6,145,914 A | * | 11/2000 | Downey et al. | 296/65.18 |
| 6,361,109 B1 | * | 3/2002 | Tokarz et al. | 297/344.15 |
| 6,533,235 B1 | * | 3/2003 | Dymerski et al. | 248/429 |

FOREIGN PATENT DOCUMENTS

| | | |
|---|---|---|
| JP | 9-277856 | 10/1997 |
| JP | 11-11186 | 1/1999 |

* cited by examiner

Primary Examiner—Anita M. King
(74) Attorney, Agent, or Firm—Browdy and Neimark, P.L.L.C.

(57) ABSTRACT

A seat slide device in which an upper slide element is slid by a drive unit along a lower track element via a flexible drive transmission element. The drive unit is provided in a floor, and the flexible drive transmission element is arranged between the drive unit and upper slide element, such that a whole drive transmission path assumes a generally "Z" or "inverted Z" shape in plan, or a triangular shape in plan. An auxiliary flexible drive transmission element may be added so that the whole drive transmission path assumes a generally "figure-of-eight" shape in plan. A lock operation/control system is provided to insure precise locking and unlocking of the upper slide element with respect to the lower track element, while simultaneously effecting selective switchover operation of the drive unit to cause forward and backward movement of the upper slide element along the lower track element.

16 Claims, 4 Drawing Sheets

SLIDE DEVICE FOR AUTOMOTIVE SEAT

BACKGROUND OF THE INVENTION

1. Field of the Invention

The present invention relates to a slide device for vehicle or automotive seat, which allows a vehicle or automotive seat to be slidingly movable via a slide rail structure in the fore-and-aft direction. In particular, the invention is directed to a powered long slide device for vehicle or automotive seat, wherein an upper slide element on which the seat is mounted is slidingly moved by a motor and control system on and along a long lower track element fixed on the floor of vehicle or automobile.

2. Description of Prior Art

In general, a long slide device is used, for instance, in a van-type automobile, such as a mini-van car or the like, the long slide device normally comprising a pair of lower track elements or lower rails of a relatively large length, i.e. a long lower ail, suited for mounting on an enlarged rear cabin space in the mini-van car, and a pair of upper slide elements or upper rails slidably fitted in the long lower rail. An automotive seat is fixedly mounted on the pair of upper rails, and therefore, the seat can be slidingly moved on and along the pair of long lower rails forwardly and backwardly in the wide rear space in the van-type automobile.

But, it is a troublesome labor for a user to manually move the seat along such long lower rails. For that reason, there has been made available a powered long slide rail device which employs motors and electrical control systems to cause forward and backward sliding movement of the upper rails on and along the lower rails.

For example, such powered long slide rail device has been disclosed from the Japanese Laid-Open Patent Publication No. 11-11186, according to which, a long lead screw element is fixed to and along a long lower rail, whereas a rotary nut element, very short relative to such long lead screw element, is provided in an upper rail so as to be in a partial threaded engagement with the long lead screw element, the rotary nut element being rotated by a motor under an electrical control, so that operation of the motor causes rotation of the rotary nut element about the lead screw element. Naturally, the rotary nut element is moved in either of forward and backward directions on and along the lead screw element, thereby causing relative forward and backward movement of the upper rail (or seat) on and along the long rail.

Incidentally, by and large, the body of automobile, in which the slide rail device is installed, is formed by putting together a plurality of panels and plate members as by spot welding. Due to such spot welding, distortion and twisting may frequently occur among those panels and plate members, resulting in a structural deformation or error in shape of the automobile body as well as in the floor of the automobile.

When it comes to mounting the foregoing long lower rail disclosed in the Patent Pub. No. 11-11186 upon the floor of automobile, the foregoing structural deformation or error in shape of automobile body will cause undesired deformation in the long lower rail because the fragility of the long lower rail becomes greater with its increased length and also cause undesired torsion or twisting in the lead screw element. Hence, it is highly possible that the threaded engagement between the rotary nut element and the lead screw element will become poor, which will make it difficult to keep a smooth relative movement of the rotary nut element along the lead screw element. Further, in the case where a seat belt is connected with the upper rail in which the rotary nut element is provided, it is of a great likelihood that a great upward load applied from the seat belt to the upper rail in such an emergency case as a collision will forcibly draw the rotary nut element upwardly from the long lead screw element, as a result of which, the long lead screw element will be bent or deformed, and therefore, it will be even much difficult to repair the slide rail device for re-use purpose.

The same goes for the case where rack and pinion gears are employed in the long slide rail device, because the rack gear has to be long for mount in and along the long lower rail and will become vulnerable to a local great load applied from the pinion gear which is connected with the upper rail, thus encountering the same problems as stated above about the combination of lead screw and rotary nut elements.

In view of the above-described problems, it is possible to use a tape-type transmission mechanism in a powered slide rail device, for example, which uses elastic tapes as a transmission means for causing relative movement between upper and lower rails, as disclosed from the Japanese Laid-Open Patent Publication No. 9-277856. According thereto, tapes are movably connected between the upper rail and a motor drive mechanism including a drive pulley with which the tapes are partially engaged, so that operation of the motor drive mechanism causes rotation of the drive pulley to move the upper rails forwardly on and along the lower rail. However, application of this prior art mechanism to the long slide rail device will raise the following problems: (i) As stated above, the mechanism disclosed is for moving the upper rails only in the forward direction along the lower rail, not moved backwardly. To enable forward and backward movement of the upper rails, the construction and operation systems of the associated drive mechanism will become quite complicated, and (ii) Since the tape used is long and partially engaged with the drive pulley, a free end portion of the tape extends outwardly from the drive pulley to a greater length than required, which is indeed true of the long slide rail. That is, because of the long lower rail, long tapes are used to cause translation of the upper rail in a long distance along that long lower rail, as a result of which, it is troublesome and difficult to store the free end portions of the long tapes, and in that case, a whole structure of slide rail device will be rather complicated, with an increased number of parts and a high cost involved. Further, the Pub. No. 9-277856 shows a locking device having a plurality of lock holes and a lock plate being engageable into a selected one of the lock holes, but no description is given about such locking device. In other word, this prior art is entirely silent for an interlocking relation between the locking device and the foregoing tape-type transmission mechanism, and therefore, it is impossible with that prior art system to insure locking engagement of the lock plate into a selected one of plural lock holes in a good-timed interlocking relation with the forward and backward sliding movement of the upper rail along the lower rail.

SUMMARY OF THE INVENTION

In view of the above-stated drawbacks, it is a primary purpose of the present invention to provide an improved seat slide device (or powered seat slide device) which is suited for a long slide device, wherein its drive transmission for causing an upper slide element to move along an long lower track element is not affected by a structural error of automobile body or floor and not affected by a deformation or twisting of the long lower track element due to a collision case or the like, neither, with an easy-to-operate locking/switching mechanism for effecting a locking/unlocking action of the upper slide element with respect to the lower track element and simultaneously causing forward and backward movement of the upper slide element along the lower track element.

In order to achieve such purpose, a slide device in accordance with the present invention is basically comprised of:

- a pair of lower track elements fixed on a floor;
- a pair of upper slide elements slidably engaged on the respective pair of lower track elements so as to be movable therealong in forward and backward directions, the pair of upper slide elements being connected with a seat;
- a drive means provided on the floor, the drive means being operable in one of a normal direction and a reverse direction;
- a flexible drive transmission means operatively and flexibly connected between the pair of upper slide elements and the drive means, with such an arrangement that, upon operation of the drive means in the normal direction, a corresponding normal drive force is transmitted through the flexible drive transmission means to the pair of upper slide elements, thereby causing movement of the pair of upper slide elements in the forward direction along the pair of lower track elements, and that, upon operation of the drive means in the reverse direction, a corresponding reverse drive force is transmitted through the flexible drive transmission means to the pair of upper slide elements, thereby causing movement of the pair of upper slide elements in the backward direction along the pair of lower track elements;
- a locking means operable for locking and unlocking the pair of upper slide elements to and from the pair of lower track elements;
- a lock operation/control means arranged between the locking means and the drive means, the lock operation/control means being normally set in a locking position and operable therefrom toward one of normal unlocking position and reverse unlocking position, such that, when the lock operation/control means is set in the locking position, both of the drive and locking means are in an inoperative state, that operation of the lock operation/control means in the normal unlocking position causes the locking means to unlock the pair of upper slide elements from the pair of lower track elements, while simultaneously activating the drive means to operate in the normal direction, and that operation of the lock operation/control means in the reverse unlocking direction causes the locking means to unlock the pair of upper slide elements from the pair of lower track elements, while simultaneously activating the drive means to operate in the reverse direction;
- the lock operation/control means including:
  - a lock operation means operable to a selected one of a first unlocking position and second unlocking position in relation to a neutral locking position, the lock operation means being operatively connected with the locking means, and being normally sent in the neutral unlocking position, wherein the first unlocking position and the second locking position correspond to the normal and reverse unlocking directions, respectively; and
  - a start switch means operable to a selected one of a normal switch-on position and a reverse switch-on position in relation to a neutral switch-off position, the start switch being electrically connected with the drive means and being normally set in the neutral switch-off position, wherein the normal and reverse switch-on positions correspond to the normal and reverse directions associated with the drive means, respectively, with such an arrangement that, when the lock operation/control means is set in the locking position, the lock operation means and the start switch means are set in the neutral locking position and the neutral switch-off position, respectively, whereby the pair of upper slide elements are locked to the pair of lower track elements, that, when the lock operation/control means is operated in the normal unlocking direction, the lock operation means is operated in the first unlocking position to cause operation of the locking means to unlock the upper slide element from the lower track element, while simultaneously, the start switch means is operated to the normal switch-on position, which in turn causes the drive means to operate in the normal direction, thereby causing movement of the pair of upper slide elements in the forward direction along the pair of lower track elements through the flexible drive transmission means, and that, when the lock operation/control means is operated in the reverse unlocking direction, the lock operation means is operated in the second unlocking position to cause operation of the locking means to unlock the upper slide element from the lower track element, while simultaneously, the start switch means is operated to the reverse switch-on position, which in turn causes the drive means to operate in the reverse direction, thereby causing movement of the pair of upper slide elements in the backward direction along the pair of lower track elements through the flexible drive transmission means.

Preferably, a whole of the flexible drive transmission means including the drive means may assume a generally "Z" or "inverted Z" shape in plan, or a generally "figure-of-eight" shape in plan, between the pair of lower track elements. Alternatively, they may assume a generally triangular shape in plan to establish a single drive transmission path with regard to one of the pair of upper slide element and one of the pair of lower track element. Preferably, the flexible drive transmission means may comprise a flexible wire cable element formed by an outer tube and a wire cable slidably inserted in the outer tube.

Other various features and advantages of the present invention will become apparent from reading of the description, hereinafter, with reference to the annexed drawings.

DETAILED DESCRIPTION OF PREFERRED EMBODIMENT OF THE INVENTION

Referring to FIGS. 1 through 9, there are illustrated preferred modes of a long seat slide device in accordance with the present invention, wherein the long seat slide device, generally designated by (10), is of a powered type provided with a motor for electrical operation to cause sliding movement of an upper rail along a long lower rail in forward and backward directions.

In this context, it is noted that, hereinafter, the wording, "forward direction" or "forwardly", and the wording, "backward direction" or "backwardly", shall refer to a direction to the forward side (F) of seat (S) and a direction to a backward side (B) of seat (S), respectively.

Figure 1:
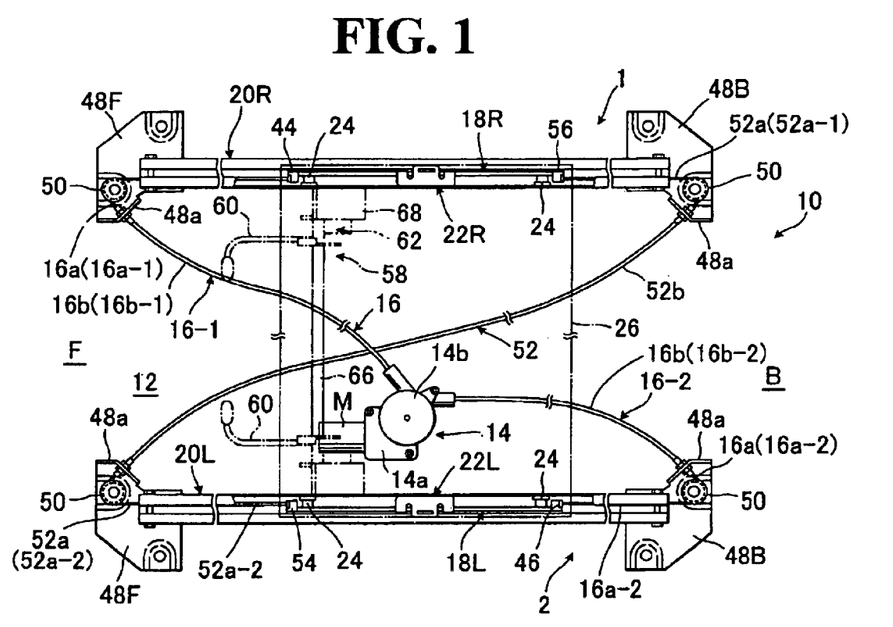
FIG. 1 is a schematic plan view showing a principal part including drive transmission elements in one exemplary mode of seat slide device in accordance with the present invention.

Reference is now made to FIG. 1 which shows one exemplary mode of the seat slide device (10) in which are provided a first slide assembly (1) on the right side and a second slide assembly (2) on the left side, as known in the art.

Generically stated, the first slide rail assembly (1) comprises a first long lower track element (20R) and a first upper slide element (18R) slidably engaged on the first long lower track element (20R) on the right side, while on the other hand, the second slide assembly (2) comprises a second long lower track element (20L) and a second upper slide element (18L) slidably engaged on the second long lower track element (20L) on the left side. Hereinafter, the first and second long lower track elements (20R) (20L) shall be embodied by first and second long lower rails (20R) (20L), respectively, whereas the first and second upper slide elements (18R) (18L) be embodied by first and second lower rails (18R) (18L), respectively.

Hence, in the illustrative embodiment, a pair of spaced-apart first and second long lower rails (20R) (20L) are fixed on a floor of vehicle (12), and a pair of spaced-apart first and second upper rails (18R) (18L), on which a seat riser member (26) or a seat (S) is fixedly mounted (see FIG. 3), are slidably fitted in the two first and second long lower rails (20R) (20L), respectively. The first and second long lower rails (20R) (20L) are firmly secured at their respective forward and backward ends upon the vehicle floor (12) by means of leg members (48F, 48B).

Figure 3:
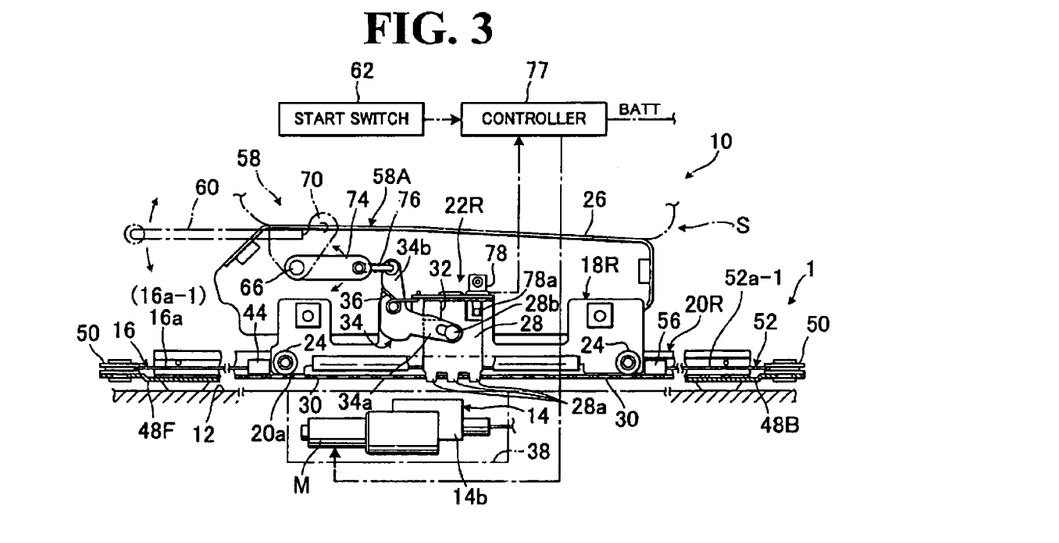
FIG. 3 is a partly broken schematic side view showing one mode of some principal parts and lock mechanism of the seat slide device, inclusive of a block chart which explanatorily shows an electrical connection and instruction flow among the principal parts and lock mechanism.

As can be seen in FIG. 3, the first and second upper rails (18R) (18L) are each provided with rollers (24) which are rotatably fitted in each of the first and second long lower rails (20R) (20L). Thus, the two upper rails (18R, 18L) or the seat (S) is free to be slidable via the rollers (24) along the two lower rails (20R, 20L) in forward and backward directions.

Figure 9:
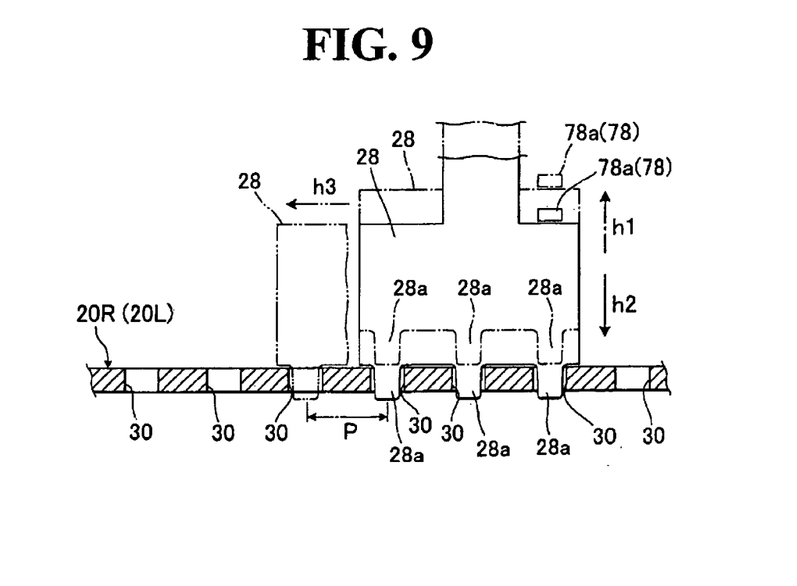
FIG. 9 is a diagram for explanatorily showing a operational relation between a latch plate and a plurality of lock holes.

As in FIG. 1, a pair of first and second latch-type locking mechanisms (22R) (22L) are provided in the first and upper rails (18R) (18L), respectively, so as to permitting for locking and unlocking the two upper rails (18R) (18L) to and from the respective two lower rails (20R) (20L). A typical example of this latch-type locking mechanism is known from the Japanese Laid-Open Patent Publication No. 1-301315. Since this is well known in the art and the first and second locking mechanisms (22R) (22L) are identical in structure to each other, a brief description will be made only of the first locking mechanism (22R). As best seen in FIGS. 3 and 9, the first locking mechanism (22R) comprises a plurality of lock holes (30) and a latch plate (28) having a three lock pieces (28a). The lock holes (30) are formed in the bottom wall (20a) of the long lower rail (20R) in the longitudinal direction thereof, and the latch plate (28) is provided in the upper rail (18R) so as to be vertically movable to and from the lock holes (30). That is, the three lock pieces (28a) of the lock plate (28) can be lowered for insertion into the corresponding three of the lock holes (30), thereby locking the upper rail (18R or 18L) to a desired point on the lower rail (20R or 20L).

In accordance with the slide rail device (10) of the present invention, generically stated, provided in the above-described known long slide rail assemblies (1, 2) are: a drive unit (14) having an electric motor (M) incorporated therein; a flexible main drive transmission means (16) for transmitting normal and reverse rotation (i.e. drive force) of the motor (M) to both first and second upper rails (18R) (18L); and a lock operation/control means (58) for causing vertical engagement and disengagement of the latch plate (28) to and from the lock holes (30) and controlling an operative relation between the motor (M) of drive unit (14) and the locking/unlocking action of the first and second latch-type locking mechanisms (22R) (22L) in conjunction with operation of the drive unit (14) and flexible main drive transmission means (16).

The drive unit (14) is of a geared motor type comprising the motor (M), a gear box portion (14a), and a rotary reel portion (14b) in which a normal winding reel and a reverse winding reel are rotatably provided, though not shown. This type of drive unit is known in the art and therefore any further description is omitted thereon. In brief, normal and reverse operation of the motor (M) causes simultaneous rotation of both of those two reels for actuating the flexible main drive transmission means (16) as will be described later.

In accordance with the present invention, the drive unit (14) is provided in a recessed storage portion (38) formed in the floor (12). This advantageously not only avoids installation of such drive element in the seat (S) including the slide assemblies (1, 2), thus simplifying the seat structure, but also avoids projection of the drive unit (14) from the floor, which may interfere with the forward and backward movement of upper rails (18R) (18L). In any case, the seat can be simplified in structure and reduced in height.

FIGS. 1, 2, 3 and 7 show a first embodiment of the slide rail device (10). According thereto, the flexible main drive transmission means (16) is so arranged as to extend from the opposite sides of the drive unit (14) and basically embodied by a flexible wire cable element (16) and pulleys (50), wherein, generically, the flexible wire cable element (16) is formed by: an outer tube (16b) of a flexible property; and a wire cable (16a), a part of which is slidably inserted in the outer tube (16b), so that the wire cable (16a) is movable forwardly and backwardly relative to the outer tube (16b).

As illustrated, the flexible main drive transmission means (16) comprises a first flexible wire cable element (16-1) and a second flexible wire cable element (16-2). More specifically, formation of the first flexible wire cable element (16-1) is such that a part of first flexible wire cable (16a-1) thereof is slidably inserted in an outer tube (16b-1) of a flexible property. Likewise, formation of the second flexible wire cable (16-2) is such that a part of the second wire cable (16a-2) thereof is slidably inserted in an outer tube (16b-2) of a flexible property.

As seen in FIG. 1, briefly stated, the first flexible wire cable element (16-1) is disposed between the drive unit (14) and the first upper rail (18R), while on the other hand, the second flexible wire cable element (16-2) is disposed between the drive unit (14) and the second upper rail (18L).

Specifically, with regard to the first flexible wire cable element (16-1), the outer tube (16b-1) thereof is at one end thereof fixedly connected with a securing lug (48a) integral with the forward leg member (48F) associated with the first long lower rail (20R), and is at another end thereof fixedly connected with the drive unit (14). The exposed portion of the first wire cable (16a-1), which extends outwardly from the foregoing one end of outer tube (16b-1), is partly contacted about the pulley (50) rotatably mounted on the forward leg member (48F). Further, that exposed portion of first wire cable (16a-1) extends backwardly in and along the first lower rail (20R) and is connected with the forward securing piece (44) of the first upper rail (18R), as best shown in FIG. 3.

On the other hand, with regard to the second flexible wire cable element (16-2), the outer tube (16b-2) thereof is at one end thereof fixedly connected with a securing lug (48a) integral with the backward leg member (48F) of the second long lower rail (20L), and is at another end thereof fixedly connected with the drive unit (14). The exposed portion of the second wire cable (16a-2), which extends outwardly from the foregoing one end of outer tube (16b-2), is partly contacted about the pulley (50) rotatably mounted on the forward leg member (48F). Further, that exposed portion of second wire cable (16a-2) extends forwardly in and along the second lower rail (12L) and is connected with the backward securing piece (46) of the second upper rail (18L), as can be seen in FIG. 2.

Figure 2:
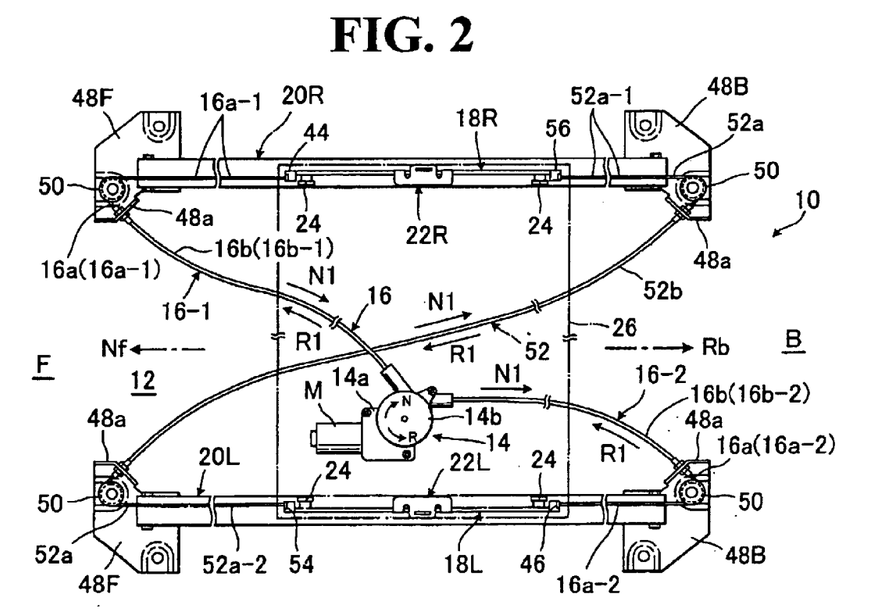
FIG. 2 is a schematic plan view which explanatorily shows actions of the principal part and drive transmission elements shown in the FIG. 1.

It is therefore observed from FIG. 2 that a whole of the flexible wire cable element (16) is arranged in a generally "inverted Z" fashion on the flat floor (12) between the first and second long lower rails (20R) (20L). Namely, a whole of the flexible wire cable element (16) assumes a generally "inverted Z" shape in plan.

But, conversely, the whole flexible wire cable element (16) may be arranged in a generally "Z" fashion in plan, as required. That is, while not shown, one and another ends of the outer tube (16b-1) of first flexible wire cable element (16-1) may be connected with a securing lug (48a) of the backward leg member (48B) of first long lower rail (20R) and with the drive unit (14), respectively, such that the exposed portion of the first wire cable (16a-1) is partly contacted about the pulley (50) of the backward leg member (48B), extends forwardly along the first lower rail (20R), and is connected with the backward securing piece (56) of first upper rail (18R). On the other hand, one and another ends of the outer tube (16b-2) of second flexible wire cable (16-2) may be connected with a securing lug (48a) of the forward leg member (48F) of second long lower rail (20L) and with the drive unit (14), respectively, such that the exposed portion of the second wire cable (16a-2) is partly contacted about the pulley (50) of the forward leg member (48F), extends backwardly along the second long lower rail (20L), and is connected with the forward securing piece (54) of second upper rail (18L). This is however an obvious matter of choice that can easily be made by any person skilled in the art.

With the above-described arrangement, as understandable from FIG. 2, upon normal operation of the motor (M), the rotary reel portion (14b) is operated in normal direction, as indicated by the arrow (N). In other words, though not shown, in such rotary reel section (14b), one reel is rotated to wind up the first wire cable (16a-1), which is indicated by the normal arrow direction (N), thereby causing withdrawal of that particular wire cable (16a-1) in the arrow direction (N1) into the rotary reel portion (14b), while at the same time, another reel is rotated in a direction opposite to the normal rotation of the afore-said one reel so as to feed the second wire cable (16a-2) out of the rotary reel section (14b), thereby extending that particular second wire cable (16a-2) outwardly in the arrow direction (N1). Thus, a synchronized relative withdrawing and extending motion is effected between the first and second wire cables (16a-1) (16a-2), by virtue of which, upon normal winding operation of the drive unit (14) in the direction (N), the withdrawal of the first wire cable (16a-1) into the drive unit (14) causes both first and second upper rails (18R) ((18L) to move forwardly on and along the first and second long lower rails (20R) (20L), without interference of the second wire cable (16a-2) with the first wire cable (16a-1), so that the seat riser member (26) or seat (S) is smoothly moved in the forward arrow direction (Nf) along the two lower rails (20R) (20L).

By contrast, upon reverse operation of the motor (M), the rotary reel portion (14b) is operated in a reverse direction as indicated by the arrow (R). In other words, though not shown, in the rotary reel portion (14b), the foregoing another reel is then rotated to wind up the second wire cable (16a-2), which is indicated by the reverse arrow direction (R), thereby causing withdrawal of that particular wire cable (16a-2) into the rotary reel portion (14b) in the arrow direction (R1), while at the same time, the foregoing one reel is rotated in a direction opposite to the reverse rotation of the said another reel, thereby causing advance of that particular first wire cable (16a-1) in the arrow direction (R1) from the rotary reel portion (14b). Under such synchronized relative withdrawing and extending motions between the first and second wire cables (16a-1) (16a-2), it is seen that, upon reverse winding operation of the drive unit (14) in the direction (R), the withdrawal of second wire cable (16a-2) into the drive unit (14) causes both first and second upper rails (18R) (18L) to move backwardly on and along the first and second long lower rails (20R) (20L), so that the seat riser member (26) or seat (S) is moved in the backward arrow direction (Rb) along the two lower rails (20R) (20L).

Designation (52) denotes an auxiliary flexible follower wire element which is operatively connected between a backward end of the first long lower rail (20R) and a forward end of the second long lower rail (20L) in such a manner to cross the flexible main drive transmission means (16), as illustrated in FIGS. 1 and 2. The auxiliary flexible follower wire element (52) may preferably be provided in the slide rail device (10) so as to be movable forwardly and backwardly in conjunction with the relative withdrawing and extending motion between the first and second wire cables (16a-1) (16a-2) of the flexible main wire element (16). This advantageously makes smooth the above-described forward and backward movement of the first and second main flexible wire elements (16-1) (16-2).

Specifically, the auxiliary flexible follower wire element (52) is shown to comprise an outer tube (52b) and a follower wire cable (52a), such that a part of the follower wire cable (52a) is slidably inserted in and through the outer tube (52b). As shown in FIG. 1, one end of the outer tube (52b) is fixedly connected with a securing lug (48a) integral with the backward leg member (48B) of the first long lower rail (20R), whereas another end of the outer tube (52b) is fixedly connected with a securing lug (48a) integral with the forward leg member (48F) of the second long lower rail (20L). One exposed portion (52a-1) of the follower wire cable (52a), which extends outwardly from the foregoing one end of outer tube (52b) is partly contacted about the pulley (50) rotatably mounted on the backward leg member (48B), while on the other hand, likewise, another exposed portion (52a-2) of the follower wire cable (52a), which extends outwardly from the foregoing another end of outer tube (52b), is partly contacted about the pulley (50) rotatably mounted on the forward leg member (48F). Further, as best seen in FIG. 2, the afore-said one exposed portion (52a-1) of wire cable (52a) extends forwardly in and along the first lower rail (20R) and is connected with the backward securing piece (56) of the first upper rail (18R), while the afore-said another exposed portion (52a-2) of wire cable (52a) extends backwardly in and along the second lower rail (20L) and is connected with the forward securing piece (54) of the second upper rail (18L).

With the addition of the foregoing auxiliary follower wire cable element (52), it is observed that a whole of the drive transmission path established by the first and second flexible wire elements (16-1) (16-2) and the auxiliary follower wire element (52) assumes a generally "figure of eight" fashion between the first and second long lower rails (20R) (20L). In that instance, as can be seen from FIG. 2, upon normal winding operation of the drive unit (14) in the direction (N), the first wire cable (16a-1) is withdrawn into the drive unit (14) as described above. Here, a major drive force is imparted through the first wire cable (16a-1) to the first upper rail (18R) which is therefore moved forwardly as indicated by the arrow (Nf). But, simultaneous therewith, the wire cable (52a) of auxiliary follower wire element (52) is moved through the outer tube (52b) in the normal arrow direction (N1), as in FIG. 2, thereby drawing the second upper rail (18L) forwardly. This therefore insures to give a forward drawing force uniformly to both of the first and second upper rails (18R) (18L).

Conversely, upon reverse operation of the drive unit (14) in the direction (R), the second wire cable (16a-2) is withdrawn into the drive unit (14), and likewise as noted above, a major driving force is imparted through the second wire cable (16a-2) to the second upper rail (18L) which is therefore moved backwardly a indicated by the arrow (Rb). Simultaneous therewith, the wire cable (52a) of auxiliary follower wire element (52) is moved through the outer tube (52b) in the reverse arrow direction (R1), as in FIG. 2, thereby insuring to give a backward drawing force uniformly to both of the first and second upper rails (18R) (18L).

Accordingly, a complete uniform transmission of both normal and reverse forces of drive unit (14) is achieved between the first and second upper rails (18R) (18L).

With the above-described arrangement, it is appreciated that, even when a structural deformation or error occurs in shape of the automobile body and in the floor of automobile to cause deformation and twisting of the long lower rails (20R, 20L), all the main flexible wire cable element (16) and auxiliary follower wire cable element (52) are resiliently flexible and left in a loosened state on the floor (12). Hence, the wire cable elements (16 and 52) themselves are not subjected to any damage and trouble by the deformation and twisting of long lower rails (20R, 20L), thereby insuring a smooth transmission therethrough of a drive force from the drive unit (14) to both two upper rails (18R, 18L). Further, only the exposed wire cable portions (16a-1, 16a-2, 52a-1 and 52a-2) are rectilinearly extended between the corresponding pulleys (50) and the corresponding upper rails (18R or 18L). In this regard, it is important to attain a sufficient contact area between a portion of each of those exposed wire cable portions (16a-1, 16a-2, 52a-1 and 52a-2) and the corresponding pulley (50) in order to give a certain tension to a particular region of each exposed wire cable portion (16a-1, 16a-2, 52a-1 and 52a-2) that extends rectilinearly between the pulley (50) and the upper rail (18R or 18L). For that purpose, the illustrated contact condition between the exposed wire cable portions (16a-1, 16a-2, 52a-1 and 52a-2) and the corresponding pulleys (50) is most preferable. In particular, the shown tangential angle of one end of each of the exposed wire cable portions (16a-1, 16a-2, 52a-1 and 52a-2) relative to the circumstance of the corresponding pulley (50) is most suited for giving an optimum tension to the rectilinearly extending region of each of the exposed wire cable portions between the pulley (50) and upper rail (18R or 18L).

With such properly loosened and tensioned wire cable arrangement, the normal and reverse drive forces of the drive unit (14) are smoothly transmitted to both two upper rails (18R) (18L). In this connection, the exposed wire cable portions (16a-1, 16a-2, 52a-1 and 52a-2) extend generally centrally of the long lower rail (20R or 20L), thus advantageously keeping the wire cable out of contact with inner walls of the lower rail (20R or 20L) which is bent and deformed due to an upward great force applied thereto via a seat belt (not shown) and upper rails (18R, 18L).

Therefore, a whole of the drive transmission between the drive unit (14) and the two upper rails (18R, 18L) are protected against any damage and trouble due to the aforementioned deformation and twisting of lower rails (20R, 20L) in contrast to the prior-art sidle rail device based on a long lead screw element and a rotary nut element.

The foregoing "figure-of-eight" arrangement of wire cable elements (16, 52) is suited for smooth movement of a relatively large seat, such as a bench seat, along the first and second long lower rails (20R) (20L).

In accordance with the present invention, as stated earlier, the lock control means (58) is provided for controlling an operative relation between the motor (M) of drive unit (14) and the locking/unlocking action of the first and second latch-type locking mechanisms (22R) (22L). That is, in order for the three lock pieces (28a) of latch plate (28) to be completely disengaged from and precisely engaged into the respective selected three of the lock holes (30) formed in each of the two lower rails (20R) (20L), the lock control means (58) is importantly provided between the latch plate (28) and a lock operation means (58A) to be described below.

Referring to FIGS. 1, 3, 7 and 8, one preferred mode of such lock operation/control means (58) is shown as comprising a lock operation means (58A) operatively connected with the latch plate (28), a start switch (62) incorporated in the lock operation means (58A), a lock detection element (78) for detecting locking and unlocking status of the latch plate (28), and a controller (77) electrically connected with a battery (BATT), the lock detection element (78) and the motor (M) of the drive unit (14).

In the present embodiment, the lock operation means (58A) is embodied by a known lever-operation-type lock operation mechanism wherein a pair of operation levers (60) are fixed to a connecting rod (66) rotatably extended between the right-side and left-side seat riser members (26) (26) fixed on the respective first and second upper rails (18R) (18L), and wherein one end of the connecting rod (66) is operatively connected, via a link member (74) and an actuator arm member (34), with the latch plate (28).

Specific description will be made only of one lock operation mechanism (at 58A) and the first slide assembly (1) for the sake of simplicity.

Figure 7:
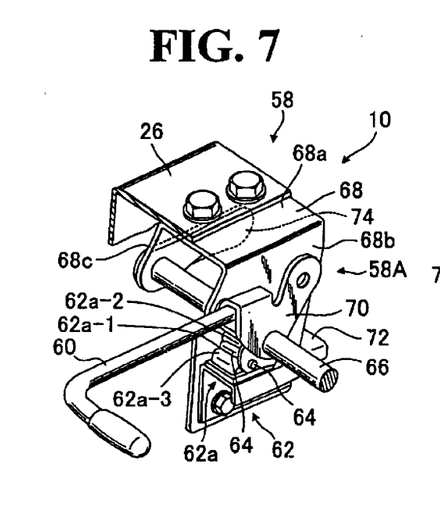
FIG. 7 is a partly broken perspective view showing one mode of lock operation element used in the seat slide device.
Figure 8:
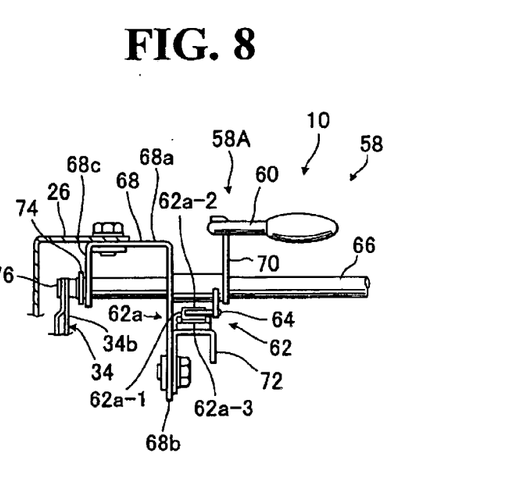
FIG. 8 is a partly broken front view of such one mode of lock operation element shown in the FIG. 7.

As understandable from FIGS. 3, 7 and 8, one end portion of the connecting rod (66) is rotatably supported by a support bracket (68) of generally inverted-U-shaped cross-section having an upper horizontal wall (68a) and pair of first and second vertical walls (68b) (68c). More specifically, as best shown in FIG. 8, that particular one end portion of the connecting rod (66) is rotatably supported by the first and second vertical walls (68b) (68c) of the support bracket (68), and further, the support bracket (68) itself is firmly fastened at its upper horizontal wall (68a) to the upper end of seat riser member (26) as by bolts and nuts. Although not shown, another end of the connecting rod (66) may simply be rotatably supported by one lateral portion of the seat riser member (26) at which the second slide assembly (2) is located.

The operation lever (60) is fixedly connected with the connecting rod (66) via a bracket (70) at a point adjacent to first vertical wall (68b) of support bracket (68) so as to allow rotation of the connecting rod (66) by vertical or clockwise and anticlockwise rotation of the operation lever (60).

As seen in FIGS. 7 and 8, the start switch (62) is provided in an operative connection with the clockwise and anticlockwise rotation of the operation lever (60). Specifically, the start switch (62) is of a known two-way switchover type comprising: a switchover element (62a) having a neutral switch-off region (62a-1), a normal switch-on region (62a-2), a reverse switch-on region (62a-3); and a contact pin (64) to be selectively in electrical contact with one of those three regions (62a) (62b) (62c). As shown, the switchover element (62a) of start switch (62) is firmly mounted on a seat bracket (72) fixed to the first vertical wall (68b) of support racket (68), while the contact pin (64) is fixedly connected with the connecting rod (66) so as to be in contact with one of the three switchover regions (62a) (62b) (62c). While not clearly shown, as indicated in FIG. 3, the start switch (62) is electrically connected with the controller (77).

As will be specified later, vertical rotation of the operation lever (60) results in switch-over displacement of the contact pin (64) to a selected one of the normal and reverse switch-on regions (62a-2) (62a-3) relative to the neutral switch-off region (62a-1), so that a proper signal is sent to the controller (77) which will send an instruction signal to the motor (M) for normal or reverse operation of the rotary reel section (14b) of drive unit (14) as well as of the flexible wire element (16) to thereby cause forward or backward movement of both two upper rails (18R) (18L) along the two long lower rails (20R) (20L).

As can be seen from FIGS. 3 and 8, the link member (74) is at one end thereof fixed to the distal end of the foregoing one end portion of connecting rod (66), while being at another end thereof connected with a joint member (76) which is in turn connected with an upper end portion (34b) of the actuator arm member (34). Actuator arm member (34) is rotatably supported on the upper rail (18R) and is at another end thereof pivotally connected with a pin (28b) fixed to the latch plate (28). Designation (36) denotes a spring for biasingly cause the actuator arm member (34) to rotate clockwise to thereby resiliently bias the latch plate (28) downwardly so that the three lock pieces (28a) of the latch plate (28) are normally kept in engagement with the respective three of the plurality of lock holes (30).

Thus, as seen in FIG. 3, the operation lever (60) is operatively connected, via the foregoing link member (74) and actuator arm member (34), with the latch plate (28), such that, as understandable from the arrows in the FIG. 3, upward and downward rotation of the operation lever (60) from the generally horizontal home position causes clockwise and anticlockwise rotation of the free end portion of link member (74) about the connecting rod (66) from the normal horizontal home position, and, irrespective of whether the free end portion of link member (74) may be rotated clockwise or anticlockwise, the actuator arm member (34) pivotally connected thereto will be rotated only in anticlockwise direction.

Normally, the operation lever (60) is positioned in a generally horizontal neutral position as shown in FIGS. 7 and 8, at which point, the contact pin (64) is in contact with the neutral switch-off region (62a-1) where the switchover element (62a) is in "off" state and no electric signal is sent therefrom to the controller (77). When the operation lever (60) is rotated upwardly from the horizontal neutral position, the contact pin (64) is brought to electrical contact with the normal switch-on region (62a-2), so that the switchover element (62a) sends a normal drive instruction signal to the controller (77). At this moment, as will be stated, the controller (77) simultaneously receives an unlocking signal from a slide switch (78a) of a lock detection element (78), determining the latch plate (28) to be unlocked from the lock holes (30), after which, responsive to the normal drive instruction signal from the switchover element (62a), the controller (77) will send the corresponding signal to the motor (M) which will then operate in the normal direction to cause the rotary reel section (14b) to rotate in the normal arrow direction (N) as in FIG. 2. On the other hand, downward rotation of the operation lever (60) from the horizontal neutral position brings the contact pin (64) to electrical contact with the reverse switch-on region (62a-3), so that a reverse drive instruction signal is sent from the switchover element (62a) to the controller (77). At this moment, likewise as in the foregoing normal drive case, the controller (77) simultaneously determines an unlocked sate of the latch plate (28) by the unlocking signal from the slide switch (78a), after which, responsive to the reverse drive instruction signal from the switchover element (62a), the controller (77) will send the corresponding signal to the motor (M) which will then operate in the reverse direction to cause the rotary reel portion (14b) to rotate in the reverse arrow direction (R) as in FIG. 2.

Accordingly, with the above-described lock control arrangement, upward rotation of the operation lever (60) from the normal horizontal position automatically results in instructing the drive unit (14) and flexible wire cable element (16) to operate in the normal directions (as indicated by the arrows N and N1 in FIG. 2), while simultaneously causing disengagement of the latch plate lock pieces (28a) from the lock holes (30), thereby placing both two upper rails (18R) (18L) or the seat (S) in the condition of being movable forwardly along the two long lower rails (20R) (20L). On the other hand, downward rotation of the operation lever (60) from the normal horizontal position automatically results in instructing the drive unit (14) and flexible wire cable element (16) to operate in the reverse directions (as indicated by the arrows R and R1 in FIG. 2), while simultaneously causing disengagement of the latch plate lock pieces (28a) from the lock holes (30), thereby placing both two upper rails (18R) (18L) or the seat (S) in the condition of being movable backwardly along the two long lower rails (20R) (20L).

The lock detection element (78) stated above is provided on the upper rail (22R) in proximity to the latch plate (28) and has a vertically movable slide switch (78a) which is normally disposed adjacently above the shoulder portion of the latch plate (28). The lock detection element (78), electrically connected to the controller (77), acts to precisely detect the engagement and disengagement of the lock pieces (28a) of the latch plate (28) into and from the corresponding three of lock holes (30), and send a proper signal to the controller (77) which will give an instruction signal to the motor (M) of the drive unit (14).

With that arrangement, when the latch plate (28) is positioned in the shown locked state where its three lock pieces (28a) are engaged in the respective three of the plurality of lock holes (30), the slide switch (78a) of lock detection element (78) is out of contact with the latch plate (28), which means that the slide switch (78a) is "off" and no signal is sent to the controller (77). Now, for example, when a passenger on the seat (S) rotates the operation lever (60) upwardly (at this moment, the contract pin (64) is also brought to contact with the normal switch-on region (62a-2) for causing forward movement of the upper rails (18R, 18L) as stated earlier.), the latch plate (28) is moved upwardly, pushing and raising the slide switch (78a). Then, upon complete disengagement of the three lock pieces (28a) from the corresponding three lock holes (30), the slide switch (78a) is turned "on", sending a signal to the controller (77) which determines the unlocked state of the upper rail (20) and gives a signal to start normal operation of the motor (M), whereupon the rotary reel section (14b) is operated as indicated by the arrow (N) to cause forward movement of the upper rails (18R) (18L) via the first and second flexible wire elements (16-1) (16-2) and the auxiliary follower wire element (52). It is thus appreciated that the motor (M) does not operate until the latch plate lock pieces (28a) are completely disengaged from the lock holes (30).

Under the foregoing state where the latch plate (28) is unlocked away from the lock holes (30), when it is desired to lock the upper rails (18R) (18L) to a desired point on the long lower rails (20R) (20L), the passenger has to rotate the operation lever (60) downwardly to the normal horizontal position. Then, the latch plate (28) is biasingly lowered toward the lock holes (30). At this moment, however, the three lock pieces (28a) of latch plate (28) are not always engaged into given three of the lock holes (30), but, it is of the high likelihood that the lock pieces (28a) will collide against the bottom wall region (20a) of the lower rail (20R or 20L) excepting the lock holes (30). Even in that case, as the latch plate (28) is not completely lowered to a predetermined locked level, the slide switch (78a) is still "on", and therefore the drive unit (14) continues to operate in the normal direction (N), causing forward movement of both two upper rails (18R) (18L) until the three lock pieces (28a) of latch plate (28) fall down into given three lock holes (30), respectively. Upon engagement of those three lock pieces (28a) in the respective given three lock holes (30), the latch plate (28) per se is lowered to the predetermined locked level and the slide switch (78a) is turned "off". Responsive to the "off" state of slide switch (78a), the controller (77) immediately sends a stop signal to the motor (M), whereupon the drive unit (14) is stopped to cease forward movement of the upper rails (18R, 18L). In this way, the present mode of lock control means (58) insures to lock the first and second upper rails (18R) (18L) to a desired point on the first and second long lower rails (20R) (20L).

The same goes for the case where the passenger rotates the operation lever (60) downwardly from the normal horizontal position to cause backward movement of the upper rails (18R, 18L) or the seat (S) and then wishes to lock the seat (S) to a desired point. Namely, in brief, when the passenger rotates the operation lever (60) downwardly to the normal horizontal position (at this moment, the contract pin (64) is also brought to contact with the reverse switch-on region (62a-3) for backward movement of the upper rails (18R, 18L) or the seat (S), as stated earlier.), the latch plate (28) is biasingly lowered toward the lock holes (30). At this point, if the lock pieces (28a) collide against the bottom wall region (20a) of the lower rail (20R or 20L) excepting the lock holes (30), the latch plate (28) is not completely lowered to a predetermined locked level, and thus, the slide switch (78a) is still "on", allowing the drive unit (14) to keep operating in the reverse direction (R) to cause backward movement of the upper rails (18R, 18L) via the first and second flexible wire elements (16-1) (16-2) and the auxiliary follower wire element (52). When the three lock pieces (28a) of latch plate (28) fall down into given three lock holes (30), respectively, the latch plate (28) is lowered to the predetermined locked level, turning off the slide switch (78a), with the result that the controller (77) immediately sends a stop signal to the motor (M) and the drive unit (14) is stopped to cease backward movement of the upper rails (18R, 18L).

While not shown, the controller (77) includes a microcomputer (CPU or the like) and the associated electric control elements, which are properly arranged so as to process and control the above-described lock control steps.

Figure 4:
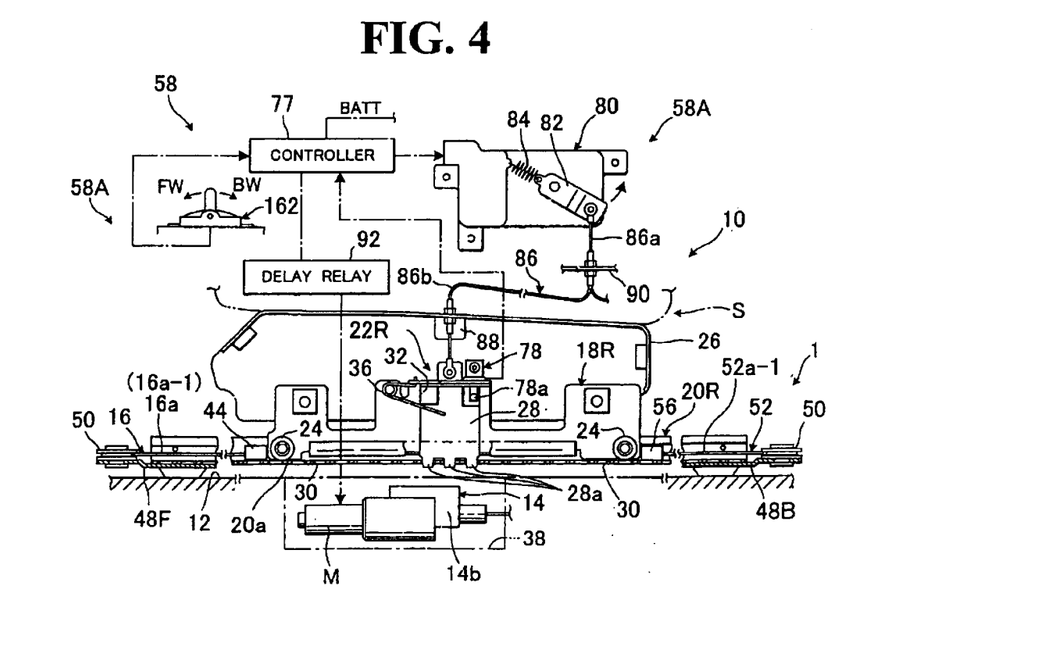
FIG. 4 is a partly broken schematic side view showing another alternative mode of principal parts and lock mechanism of the seat slide device, inclusive of a block chart which explanatorily shown an electrical connection and instruction flow among the principal parts and lock mechanism.

FIG. 4 shows another alternative mode of the above-described lock operation/control means (58). According thereto, as the lock operation means (58A), a start switch element (162) and an electrically operated actuator (80) are provided. As similar to the first mode of lock operation/control means (58), the lock detection element (78) is provided for detecting locking and unlocking status of the latch plate (28) and the controller (77) is also provided, which is electrically connected with a battery (BATT), the lock detection element (78) and the motor (M) of the drive unit (14). In the present mode, a delay relay (92) is electrically connected between the controller (77) and the motor (M) of the drive unit (14). Concerning this alternative mode of lock operation/control means (58), specific description will be made only with regard to one lock operation mechanism (at 58A) and the first slide assembly (1), for the sake of simplicity.

As indicated by one-dot chain lines in FIG. 4, the start switch element (162) is of an automatically returnable two-way switching type that are rotatable in one of forward and reverse switch-on directions (FW) (BW) and automatically returnable to the neutral switch-off position shown by the solid line. This start switch element (162) is electrically connected with the controller (77) for transmitting normal or reverse drive instruction signal to the motor (M) and also electrically connected with the actuator (80) for unlocking operation of that particular actuator (80). That is, in brief, when the start switch element (162) is turned over to the normal direction (FW), the actuator (80) is driven to cause disengagement of the latch plate (28) from the lock holes (30), while simultaneously, the drive unit (14) is operated in the normal direction (N) after lapse of a certain delay time for movement of the seat (S) in the forward direction (Nf).

On the other hand, turning the start switch element (162) over to the reverse direction (BW) results in the actuator (80) being driven to cause disengagement of the latch plate (28) from the lock holes (30), while simultaneously, the drive unit (14) is operated in the reverse direction (R) after lapse of a certain delay time for movement of the seat (S) in the forward direction (Rb). The start switch element (162) may be mounted on a lateral wall of a seat cushion of the seat (S) or other suitable location of the seat (S).

The actuator (80) is of a known electrically operated actuator having a rotary actuator piece (82) which is to be rotated at a predetermined angle by a motor (not shown) provided therein, wherein the rotary actuator piece (82) is resiliently biased downwardly by a spring (84) to a predetermined home position. The actuator (80) is electrically connected with the controller (77), and the free end of the rotary actuator piece (82) is connected with a wire cable (86). The wire cable (86) is formed by an outer tube (86b) and an inner wire cable (86a) slidably inserted in the outer tube (86b). As shown, the outer tube (86b) is fixedly connected between a securing member (90) and the seat riser member (26), and one and another ends of the inner wire cable (86a) are fixed to the free end of the rotary actuator piece (82) and the upper end of the latch plate (28), respectively.

When the start switch (162) is turned on in the normal direction (FW), a signal is sent to the controller (77) which in turn sends a normal instruction signal to the actuator (80). Then, the rotary actuator piece (82) is rotated anticlockwise from the home position, thereby drawing the inner wire cable (86a) upwardly, with the result that the latch plate (28) is raised accordingly against a biasing force of the spring (84), with the three lock pieces (28a) thereof being disengaged from the three lock holes (30). Simultaneous therewith, the latch plate (28) is moved upwardly, pushing and raising the slide switch (78a). Then, upon complete disengagement of the three lock pieces (28a) from the respective three lock holes (30), the slide switch (78a) is turned "on," sending a signal to the controller (77) for instruction to cause normal operation of the drive unit (14). The controller (77) determines the unlocked state of the upper rail (20) and gives an "on" signal to start normal operation of the motor (M) via the delay relay (92), whereupon the rotary reel portion (14B) is operated as indicated by the arrow (N) to cause the upper rails (18R, 18L) or the seat (S) to move in the forward direction (Nf) via the first and second flexible wire elements (16-1) (16-2) and the auxiliary follower wire element (52). In this regard, it is arranged such that the delay relay (92) does not work in this particular case where the "on" signal is inputted thereto from the controller (77), allowing that "on" signal to be transmitted directly to the motor (M).

Under such state, by retaining the start switch (162) to the normal switch-on side (FW), the drive unit (14) continues to operate in the normal direction (N), thereby keeping on movement of the seat (S) in the forward direction (Nf).

At this stage, when it is desired to lock the seat (S) or the upper rails (18R, 18L) to a certain position, a seat occupant should let the start switch (162) returned to the neutral switch-off position, at which time, a switch-off signal is sent therefrom to the controller (77). Responsive to the switch-off signal, the controller (77) sends an "off" signal to the actuator (80) which stops operation to release the rotary actuator piece (82) from the upward locked state, whereupon the rotary actuator piece (82) is rotated clockwise and returned to the home position under the biasing force of spring (84), which in turn allows downward movement of the latch plate (28) via the wire cable (86) toward lock holes (30). Simultaneous therewith, the slide switch (78a) is moved donwardly. In this regard, likewise as in the first mode described previously, if the latch plate lock pieces (28a) are completely engaged in the lock holes (30), the slide switch (78a) detects it and the lock detection element (78) sends a lock-on signal to the controller (77). Then, the controller (77) outputs an "off" signal to the delay relay (92). Only on this occasion, the delay relay (92) works to delay its switch-on action for a predetermined period of time, so that a certain delay time is given before switching on the relay action. Therefore, after lapse of such delay time, an "off" signal is outputted from the delay relay (92) to the motor (M) for stopping its drive operation, thereby ceasing normal operation of the rotary reel portion (14b) and all the wire cable elements (16 and 52). It is noted here that, as can be seen in FIG. 9, the delay time is preferably set in the delay relay (92) on the basis of a time (h3) required for the latch plate (28) to move at one pitch (P) between one lock hole (30) and another adjacent lock hole (30). Accordingly, it is to be appreciated that, when returning the start switch element (162) to the neutral switch-off position, the lock plate (28), lowered to a level corresponding to the bottom wall (20a) of lower rail (20R or 20L), is being still moved forwardly at the afore-said one pitch (P), in order to insure that the three lock pieces (28a) of lock plate (28) are engaged into the respective three lock holes (30) in conjunction with the slide switch (78a) which detects a complete engagement of those lock pieces (28a) in the respective lock holes (30).

Of course, the same delay process as described above is effected for the case where the start switch element (162) is turned over to the reverse direction (BW). Further description thereon is omitted for the sake of simplicity in view of the previous brief description concerning the start switch element (162).

Figure 5:
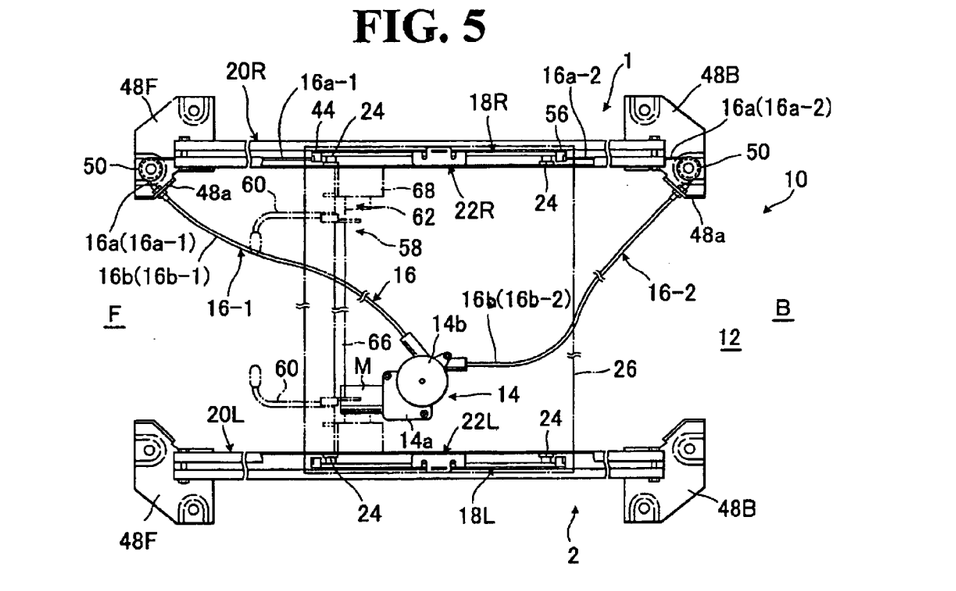
FIG. 5 is a schematic plan view of another mode of the seat slide device, which shows a generally triangular shape in plan of drive transmission path.
Figure 6:
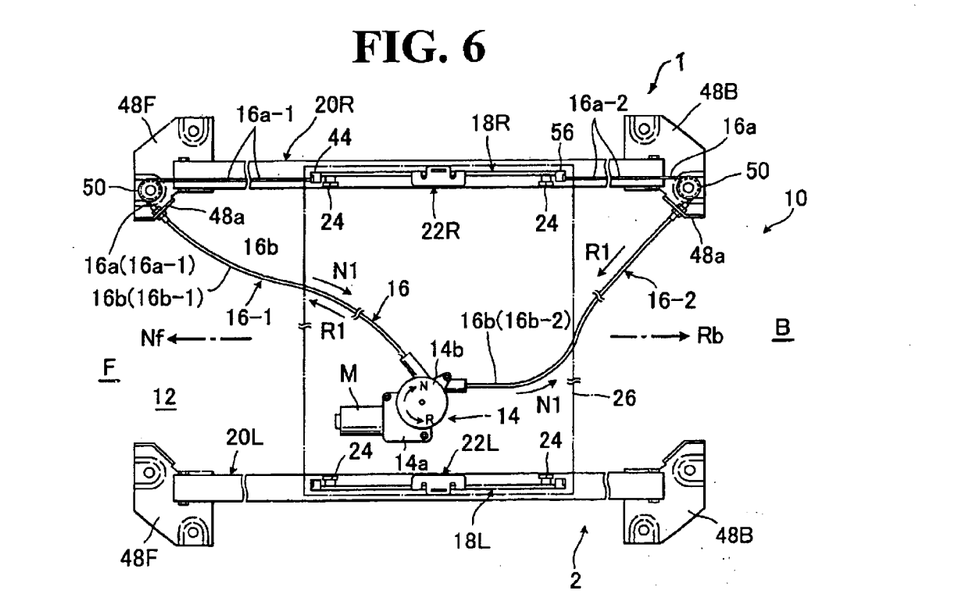
FIG. 6 is a schematic plan view which explanatorily shows actions of the principal part and drive transmission elements shown in the FIG. 5.

FIGS. 5 and 6 shows an alternative second mode of the slide rail device (10) which is basically identical to the foregoing first mode in structure and associated lock and drive mechanisms, excepting a simplified mode of the flexible main drive transmission means (16). Therefore, all like designations to be given hereinafter correspond to all like designations that have been used in the first embodiment described previously, and any further description is omitted for the common parts and mechanisms between the first and second embodiments for the sake of simplicity.

According to the present embodiment, the flexible main drive transmission means (16) is operatively connected with one of the two upper rails (18R) (18L) to cause fore-and-aft movement of both of the upper rails or the seat (S) along the long lower rails (20R, 20L).

Namely, as similar to the first mode, there are provided a first flexible wire cable element (16-1) and a second flexible wire cable element (16-2). But, in the present mode, the second flexible wire cable element (16-2) is operatively connected between the first upper rail (18R) and the drive unit (14). Specifically, the outer tube (16b-2) of the second flexible wire cable element (16-2) is at one end thereof fixedly connected with a securing lug (48a) integral with the backward leg member (48B) associated with the first long lower rail (20R). Also, another end of the outer tube (16b-2) is fixedly connected with the drive unit (14). As shown, the exposed portion of the second wire cable (16a-2), which extends outwardly from the foregoing one end of outer tube (16b-2), is partly contacted about the pulley (50) rotatably mounted on the forward leg member (48F). Further, that exposed portion of second wire cable (16a-2) extends forwardly in and along the first lower rail (20R) and is connected with the backward securing piece (56) of the first upper rail (18R).

It is therefore observed on the plan in FIG. 5 that a whole of the flexible wire cable element (16) is arranged in a generally triangular fashion in plan between the first long lower rail (20R) and the drive unit (14). Of course, conversely, the whole flexible wire cable element (16) may be arranged between the second long lower rail (20L) and the drive unit (14) in a generally triangular fashion in plan.

With such triangular transmission arrangement, as understandable from FIG. 6, operation of the rotary reel portion (14b) in one of the normal and reverse arrow directions (N) (R) results in synchronized relative withdrawing and extending motion between the first and second wire cables (16a-1) (16a-2) on the basis of the not-shown reel rotation in the rotary reel portion (14b) as elaborated in the first embodiment. No further detailed explanation thereon is omitted.

Owing to such synchronized relative motion between the first and second wire cables (16a-1) (16a-2), normal winding operation of the drive unit (14) in the normal direction (N) causes withdrawal of the first wire cable (16a-1) into the drive unit (14), which in turn causes both first and second upper rails (18R) ((18L) to move forwardly along the first and second long lower rails (20R) (20L), without interference of the second wire cable (16a-2) with the first wire cable (16a-1). Thus, the seat riser member (26) or seat (S) is smoothly moved in the forward arrow direction (Nf) along the two lower rails (20R) (20L). By contrast, upon reverse operation of the motor (M), the second wire cable (16a-2) is withdrawn into the drive unit (14), thereby causing both first and second upper rails (18R) (18L) to move backwardly along the first and second long lower rails (20R) (20L), without interference of the first wire cable (16a-1) with the second wire cable (16a-1), so that the seat riser member (26) or seat (S) is smoothly moved in the forward arrow direction (Nf) along the two lower rails (20R) (20L).

As similar to the first mode, this triangular flexible wire cable arrangement effectively prevents the drive transmission from being affected by the deformation and twisting of the long lower rails (20R, 20) as well as by the upward great force applied to the long lower rails via a seat belt (not shown) and upper rails (18R, 18L).

The above-described generally inverted-Z-shaped, generally Z-shaped, or generally triangular arrangement of wire cable element (16) is especially suited for causing movement of a relatively small seat, such as a driver's seat or single seat. Of course, in place of the wire cable element, the flexible drive transmission elements (16, 52) may be formed by any other proper flexible materials, such as chains, tapes, belts or ropes.

While having described the present invention thus far, it should be understood that the invention is not limited to the illustrated embodiment, but any other modification, replacement, and addition will be applied thereto without departing from the scopes of the appended claims.

What is claimed is:

1. A slide device in combination with a seat and a floor, comprising:
   a pair of lower track elements fixed on said floor;
   a pair of upper slide elements slidably engaged on the respective said pair of lower track elements so as to be movable therealong in forward and backward directions, said pair of upper slide elements being connected with said seat;
   a drive means provided in said floor, said drive means being operable in one of a normal direction and a reverse direction;
   a flexible drive transmission means operatively and flexibly connected between said pair of upper slide elements and said drive means, with such an arrangement that, upon operation of said drive means in said normal direction, a corresponding normal drive force is transmitted through said flexible drive transmission means to said pair of upper slide elements, thereby causing movement of the pair of upper slide elements in the forward direction along said pair of lower track elements, and that, upon operation of said drive means in said reverse direction, a corresponding reverse drive force is transmitted through said flexible drive transmission means to said pair of upper slide elements, thereby causing movement of the pair of upper slide elements in the backward direction along said pair of lower track elements;
   a locking means operable for locking and unlocking said pair of upper slide elements to and from said pair of lower track elements;
   a lock operation/control means arranged between said locking means and said drive means, said lock operation/control means being normally set in a locking position and operable therefrom toward one of normal unlocking position and reverse unlocking position, such that, when the lock operation/control means is set in said locking position, both of said drive and locking means are in an inoperative state, that operation of the lock operation/control means in said normal unlocking position causes said locking means to unlock said pair of upper slide elements from said pair of lower track elements, while simultaneously activating said drive means to operate in said normal direction, and that operation of the lock operation/control means in said reverse unlocking direction causes said locking means to unlock said pair of upper slide elements from said pair of lower track elements, while simultaneously activating said drive means to operate in said reverse direction;
   said lock operation/control means including:
      a lock operation means operable to a selected one of a first unlocking position and second unlocking position in relation to a neutral locking position, said lock operation means being operatively connected with said locking means, and being normally set in said neutral unlocking position, wherein said first unlocking position and said second locking position correspond to said normal and reverse unlocking directions, respectively;
      and
      a start switch means operable to a selected one of a normal switch-on position and a reverse switch-on position in relation to a neutral switch-off position, said start switch being electrically connected with said drive means and being normally set in said neutral switch-off position, wherein said normal and reverse switch-on positions correspond to said normal and reverse directions associated with said drive means, respectively,
   with such an arrangement that, when said lock operation/control means is set in said locking position, said lock operation means and said start switch means being set in said neutral locking position and said neutral switch-off position, respectively, whereby said pair of upper slide elements are locked to said pair of lower track elements, that, when said lock operation/control means is operated in said normal unlocking direction, said lock operation means is operated in said first unlocking position to cause operation of said locking means to unlock said upper slide element from said lower track element, while simultaneously, said start switch means is operated to said normal switch-on position, which in turn causes said drive means to operate in said normal direction, thereby causing movement of said pair of upper slide elements in said forward direction along said pair of lower track elements through said flexible drive transmission means, and that, when said lock operation/control means is operated in said reverse unlocking direction, said lock operation means is operated in said second unlocking position to cause operation of said locking means to unlock said upper slide element from said lower track element, while simultaneously, said start switch means is operated to said reverse switch-on position, which in turn causes said drive means to operate in said reverse direction, thereby causing movement of said pair of upper slide elements in said backward direction along said pair of lower track elements through said flexible drive transmission means.

2. The slide device as claimed in claim 1, wherein said pair of lower track elements are greater in length than said pair of upper slide elements.

3. The slide device according to claim 2, wherein said pair of lower track elements comprises a pair of long lower rail, and wherein said pair of upper slide elements comprises a pair of upper rail slidably fitted in said long lower rail.

4. The slide device as claimed in claim 1, wherein one of said pair of lower track elements has a first end and a second end, and another of said pair of lower track elements has a first end and a second end, wherein said flexible drive transmission means comprises: a first flexible drive transmission element flexibly extended between said drive means and said first end of said one of said pair of lower track elements; and a second flexible drive transmission element flexibly extended between said drive means and said second end of said another of said pair of lower track elements, wherein said first flexible drive transmission element has: one end portion extending toward said first end of said one of said pair of lower track elements and is connected with one of said pair of upper slide elements; and another end portion connected with said drive means, wherein said second flexible drive transmission element has: one end portion extending toward said second end of said another of said pair of lower track elements and is connected with another of said pair of upper slide elements; and another end portion connected with said drive means, and wherein said one end portion of said first flexible drive transmission element enters said first end of said one of said pair of lower track elements and extends in and along said one of said pair of lower track elements, while on the other hand, said one end portion of second flexible drive transmission elements enters said second end of said another of said pair of lower track elements and extends in and along said another of said pair of lower track elements, whereupon a whole of said first and second flexible drive transmission elements assumes a generally "Z" or "inverted Z" shape in plan.

5. The slide device according to claim 4, wherein said one end portion of said second flexible drive transmission element extends toward said second end of said one of said pair of lower track elements and is connected with said one of said upper slide elements, such that said one end portion of the second flexible drive element enters said second end of said one of said pair of lower track elements and extends in and along said one of said pair of lower track elements, whereupon a whole of said first and second flexible drive transmission elements assumes a generally triangular shape in plan with respect to said one of said pair of lower track elements.

6. The slide device according to claim 4, wherein
said first flexible drive transmission element comprises a first flexible wire cable element formed by an outer tube and a wire cable slidably inserted in said outer tube, said wire cable having: one exposed portion extending outwardly from said outer tube, said one exposed portion corresponding to said one end portion of said first flexible drive transmission element and being connected with said one of said pair of upper slide elements; and another exposed portion corresponding to said another end portion of the first flexible drive transmission element and being connected with said drive means, wherein said second flexible drive transmission element comprises a second flexible wire cable element formed by an outer tube and a wire cable slidably inserted in said outer tube, said wire cable having: one exposed portion extending outwardly from said outer tube, said one exposed portion corresponding to said one end portion of said second flexible drive transmission element and being connected with said another of said pair of upper slide elements; and another exposed portion corresponding to said another end portion of the second flexible drive transmission element, and wherein said one exposed portion of said first flexible wire cable element enters said first end of said one of said pair of lower track elements and extends in and along said one of said pair of lower track elements, while on the other hand, said one exposed portion of said second flexible wire cable elements enters said second end of said another of said pair of lower track elements and extends in and along said another of said pair of lower track elements.

7. The slide device according to claim 4, wherein said first and second ends of each of said pair of lower track elements are each provided wish a rotatable pulley thereon, wherein said one exposed portion of said first flexible wire cable element is partly contacted about said rotatable pulley so as to extend rectilinearly in and long said one of said pair of lower track elements and be connected with said one of said pair of upper slide elements, and wherein said one exposed portion of said second flexible wire cable element is partly contacted about said rotatable pulley so as to extend rectilinearly in and long said another of said pair of lower track elements and be connected with said another of said pair of upper slide elements.

8. The slide device as claimed in claim 4, wherein there is provided an auxiliary flexible drive transmission means workable in conjunction with said flexible drive transmission means to allow smooth transmission of said corresponding normal and reverse drive forces therethrough, thereby insuring movement of the pair of upper slide elements in the forward and reverse directions along said pair of lower track elements, and wherein said auxiliary flexible drive transmission means comprises one auxiliary flexible drive transmission element provided between said pair of lower track elements in such a manner that one end portion of said auxiliary flexible drive transmission element extends toward said second end of said one of said pair of lower track elements and is connected with said one of said pair of upper slide elements, while another end portion of said auxiliary flexible drive transmission element extends toward said first end of said one of said pair of lower track elements and is connected with said another of said pair of upper slide elements, whereupon a whole of said first and second flexible drive transmission elements and said auxiliary flexible drive transmission element assumes a generally "figure-of-eight" shape in plan.

9. The slide device according to claim 8, wherein said auxiliary flexible drive transmission element comprises an auxiliary flexible wire cable element formed by an outer tube having one end and another end and a wire cable slidably inserted in said outer tube, said wire cable having: one exposed portion extending outwardly from said one end of said outer tube, said one exposed portion corresponding to said one end portion of said auxiliary flexible drive transmission element and being connected with said one of said pair of upper slide elements; and another exposed portion extending outwardly from said another end of said outer tube, said another exposed portion corresponding to said another end portion of said auxiliary flexible drive transmission element and being connected with said another of said pair of upper slide elements, and wherein said one exposed portion of said auxiliary flexible wire cable element enters said second end of said one of said pair of lower track elements and extends in and along said one of said pair of lower track elements, while on the other hand, said another exposed portion of said auxiliary flexible wire cable element enters said first end of said another of said pair of lower track elements and extends in and along said another of said pair of lower track elements.

10. The slide device according to claim 9, wherein said first and second ends of each of said pair of lower track elements are each provided with a rotatable pulley thereon, wherein said one exposed portion of said auxiliary flexible wire cable element is partly contacted about said rotatable pulley so as to extend rectilinearly in and long said one of said pair of lower track elements and be connected with said one of said pair of upper slide elements, and wherein said another exposed portion of said auxiliary flexible wire cable element is partly contacted about said rotatable pulley so as to extend rectilinearly in and long said another of said pair of lower track elements and be connected with said another of said pair of upper slide elements.

11. The slide device as claimed in claim 1, wherein said lock means comprises a latch means movably provided in said pair of upper slide elements, said latch means being latchingly engageable and disengageable to and from said pair of lower track elements to thereby cause locking and unlocking of said pair of upper slide elements to and from said pair of lower track elements, wherein said lock operation/control means further includes a detection means for detecting said latching engagement and disengagement of said pair of upper slide elements to and from said pair of lower track elements, wherein said lock operation means comprises an operation lever operatively connected with said latch means through a connecting means, said operation lever being normally set in said neutral locking position and operable to a selected one of said first and second unlocking positions in relation to said neutral locking position, wherein said start switch means is operable in an interlocked relation with said operation lever, with such an arrangement that, when said operation lever is operated in one of said first and second unlocking positions, said drive means is not operated in neither of said normal and reverse directions until said detection means detects said latching disengagement of said latch means from said pair of lower track elements, and that, during operation of said driven means in one of said normal and reverse directions, when said operation lever is operated in said neutral locking position, said drive means continues to operate until said detection means detects said latching engagement of said latch means with said pair of lower track element.

12. The slide device as claimed in claim 11, wherein a delay relay means is electrically connected between said drive means and said start switch means, such that, when said operation lever is operated in said neutral locking position to stop the operation of said drive means, a predetermined delay time is given by said delay relay means prior to said drive means ceasing its operation.

13. The slide device as claimed in claim 1, wherein said lock means comprises a latch plate movably provided in said pair of upper slide elements and a plurality of lock holes formed in said pair of lower track elements, said latch means being latchingly engageable and disengageable to and from a part of said plurality of lock holes of said lower track elements to thereby cause locking and unlocking of said pair of upper slide elements to and from said pair of lower track elements, wherein said lock operation/control means further includes: a detection means for detecting said latching engagement and disengagement of said pair of upper slide elements to and from said pair of lower track elements; and a delay relay means electrically connected between said drive means and said start switch means, said delay relay means being workable for giving a predetermined delay time prior to said drive means ceasing its operation when said operation lever is operated in said neutral locking position, wherein said predetermined delay time is preset on basis of a time required for said pair of upper slide elements to move at one pitch between one and adjacent another of said plurality of lock holes, wherein said lock operation means comprises an operation lever operatively connected with said latch means through a connecting means, said operation lever being normally set in said neutral locking position and operable to a selected one of said first and second unlocking positions in relation to the neutral locking position, and wherein said start switch means is operable in an interlocked relation with said operation lever, with such an arrangement that, when said operation lever is operated in one of said first and second unlocking positions, said drive means is not operated in neither of said normal and reverse directions until said detection means detects said latching disengagement of said latch means from said pair of lower track elements, and that, during operation of said drive means in one of said normal and reverse directions, when said operation lever is operated in said neutral locking position, said drive means continues to operate for said predetermined delay time and until said detection means detects said latching engagement of said latch means with said pair of lower track element.

14. The slide device according to claim 11, wherein said latch means comprises a latch plate which is movable upwardly for latching disengagement from said pair of lower track elements and also movable downwardly for latching engagement with said pair of lower track elements, wherein said connecting means comprises: a connecting rod to which said operation lever is fixed, said connecting rod being rotatably supported between said pair of upper slide elements; a link member having one end fixed to said connecting rod and another end; and an actuator arm member rotatably supported by said pair of upper slide elements, said actuator arm member having: one end connected via a joint member with said another end of said link member; and another end pivotally connected with said latch plate, wherein said link member is normally set in a generally horizontal position corresponding to said neutral locking position of said operation lever and rotatable clockwise and anticlockwise by operation of said operation lever to said first and second unlocking positions, in such a manner that clockwise and anticlockwise rotation of said link member from said generally horizontal position inevitably results in upward disengagement of said latch plate from said pair of lower track elements, wherein said drive means includes an electric motor, wherein said detection means comprises an electronic control element and a slide switch electrically connected with said electronic control element, wherein said electronic control element is electrically connected with said electric motor of said drive means, wherein said slide switch is disposed in a path along which said latch plate is moved vertically, such that, when said latch plate is moved upwardly and completely disengaged from said pair of lower track elements, the slide switch is turned on, sending an unlocking signal to said electronic control element which in turn sends an "on" signal to said electric motor, whereby the electric motor is operated in a direction corresponding to one of said normal and reverse directions.

15. The slide device as claimed in claim 1, wherein said lock operation/control means further includes: a detection means for detecting said latching engagement and disengagement of said pair of upper slide elements to and from said pair of lower track elements; and a delay relay means electrically connected between said drive means and said start switch means, said delay relay means being workable for giving a predetermined delay time prior to said drive means ceasing its operation when said operation lever is operated in said neutral locking position, wherein said lock operation means and said start switch means comprise a combination of a switch element and an actuator, wherein said switch element is electrically connected with said actuator and said drive means via an electronic controller and a delay relay means, wherein said switch element corresponds to said start switch means and thus is operable to a selected one of said normal and reverse switch-on positions in relation to said neutral switch-off position in which the switch element is normally set, and wherein said actuator is operatively connected with said latch means, with such an arrangement that operation of said switch element in either of said normal and reverse switch-on positions results in operation of said actuator to cause said disengagement of said latch means from said pair of lower track elements, that, when said operation lever is operated in one of said first and second unlocking positions, said drive means is not operated in neither of said normal and reverse directions until said detection means detects said latching disengagement of said latch means from said pair of lower track elements, and that, during operation of said driven means in one of said normal and reverse directions, when said operation lever is operated in said neutral locking position, said drive means continues to operate for said predetermined delay time and until said detection means detects said latching engagement of said latch means with said pair of lower track element.

16. The slide device as claimed in claim 15, wherein said latch means comprises a latch plate movably provided in said pair of upper slide elements and a plurality of lock holes formed in said pair of lower track elements, said latch plate being latchingly engageable and disengageable to and from a part of said plurality of lock holes of said lower track elements to thereby cause locking and unlocking of said pair of upper slide elements to and from said pair of lower track elements, and wherein said predetermined delay time is preset on basis of a time required for said pair of upper slide elements to move at one pitch between one and adjacent another of said plurality of lock holes, with such an arrangement that operation of said switch element in either of said normal and reverse switch-on positions results in operation of said actuator to cause disengagement of said latch plate from said part of said plurality of lock holes, that, when said operation lever is operated in one of said first and second unlocking positions, said drive means is not operated in neither of said normal and reverse directions until said detection means detects said disengagement of said latch plate from said part of said plurality of lock holes, and that, during operation of said driven means in one of said normal and reverse directions, when said operation lever is operated in said neutral locking position, said drive means continues to operate for said predetermined delay time and until said detection means detects engagement of said latch plate with another part of said plurality of lock holes.

* * * * *